(12) United States Patent
Dufour et al.

(10) Patent No.: US 6,700,537 B2
(45) Date of Patent: Mar. 2, 2004

(54) METHOD FOR CALIBRATING A WIDEBAND DIRECTION FINDING SYSTEM

(75) Inventors: Martial Dufour, Aylmer (CA); François Patenaude, Hull (CA)

(73) Assignee: Her Majesty the Queen in right of Canada, as represented by the Minister of Communications, Ottawa (CA)

(*) Notice: Subject to any disclaimer, the term of this patent is extended or adjusted under 35 U.S.C. 154(b) by 230 days.

(21) Appl. No.: 09/941,706

(22) Filed: Aug. 30, 2001

(65) Prior Publication Data

US 2003/0187601 A1 Oct. 2, 2003

Related U.S. Application Data (60) Provisional application No. 60/229,062, filed on Aug. 31, 2000.

(51) Int. Cl.[7] ................................................. G01S 3/52
(52) U.S. Cl. ..................... 342/418; 342/168; 342/442
(58) Field of Search ................................. 342/165, 168, 342/174, 417, 418, 442

(56) References Cited

U.S. PATENT DOCUMENTS

| | | | | |
|---|---|---|---|---|
| 3,886,555 A | * | 5/1975 | Royal | 343/117 |
| 4,613,821 A | | 9/1986 | Sternberg et al. | |
| 4,728,906 A | * | 3/1988 | Turl et al. | 331/4 |
| 4,978,963 A | * | 12/1990 | Thorpe | 342/433 |
| 5,043,666 A | * | 8/1991 | Tavernetti et al. | 324/326 |
| 5,065,351 A | | 11/1991 | Johnston et al. | |
| 5,396,440 A | | 3/1995 | Coburn | |
| 5,655,217 A | | 8/1997 | Lemson | |
| 5,828,710 A | | 10/1998 | Beale | |
| 6,014,102 A | | 1/2000 | Mitzlaff et al. | |

FOREIGN PATENT DOCUMENTS

CA  2298833  2/2000

* cited by examiner

*Primary Examiner*—Dao Phan
(74) *Attorney, Agent, or Firm*—Shapiro Cohen; Dennis R. Haszko (57) ABSTRACT

The invention is a method of calibrating the sensor system of a wideband direction finder using a noise source. The sensor system includes at least two wideband tuners, and an analog/digital (A/D) converter connected to each wideband tuner. The calibration method involves selecting a common set of center frequencies for each of the wideband tuners. The wideband tuners receive a signal from the noise source on a per data frame basis. The passband of the received signal is then divided into a number of time-sampled data frames. For each time-sampled data frame, both a gain variation and a phase variation are calculated for the noise received at each wideband tuner. Gain and phase differences between the signal received by each wideband tuner within the same frame are compared. Based on the time-sampled data collected, the phase and gain differences for the signals received at the tuners which have not been previously mapped can be determined. As a result, this calibration method determines a series of calibration factors for each frame, and for a wide range of frequencies.

9 Claims, 7 Drawing Sheets

METHOD FOR CALIBRATING A WIDEBAND DIRECTION FINDING SYSTEM

This application claims the benefit of Provisional application No. 60/229,062, filed Aug. 31, 2000.

FIELD OF INVENTION

This invention relates to a method and system for calibrating wideband direction finding devices. More particularly, the invention relates to a calibration method utilizing a data frame technique to sample the entire passband of an antenna array.

BACKGROUND TO THE INVENTION

In the field of radio communications, direction-finding (DF) equipment is essentially an antenna-receiver combination that determines the coordinates of a radio signal relative to the DF location. DF equipment enables one to locate or monitor various radio signal sources, stationary or otherwise, by determining the direction of arrival (DOA) and/or angle of arrival (AOA) relative to the ground of the emitted radio signal from a source to the DF receiver. DF equipment has many terrestrial and aerospace applications. Such applications may require the ability to determine the coordinates of radio source over a broad range of broadband frequencies. For instance, wideband DF equipment may scan anywhere from a range of a few MHz to several thousand MHz. As a result, wideband DF equipment has been very useful in various applications which track a wide range of signal frequencies.

The calibration of wideband DF equipment has been a challenge. External factors, such as weather conditions and location, alter the calibration factors of DF equipment. The calibration method utilized should be accurate within an acceptable tolerance over a wide frequency range. The DF equipment scans the entire range of frequencies and stores a series of calibration factors for the entire range.

Usually, DF equipment has an antenna portion with at least two antenna elements. The antenna portion may be rotatable or stationary. The rotatability allows for the determination of the direction of arrival of the signal. For a specific frequency range, specific frequencies are sampled over time. This time-sampled data is then transformed into the frequency domain using the Fast Fourier Transform (FFT). Subsequent measurements are obtained by retuning the DF equipment to scan a different frequency range. For each frequency range, any amplitude and/or phase differences between signals received by the antenna elements are then processed to determine the DOA and AOA coordinates of the signals.

To calibrate the DF equipment, calibration measurements have to be made to obtain calibration factors. These calibration factors are to be taken into account when performing DF measurements to allow for inconsistencies introduced in the DF measurements by the DF equipment itself. A noise source can be used as the signal source for the DF equipment when conducting calibration measurements. These calibration factors are measured for each frequency range to be scanned by the DF equipment.

Tkalcevic, in U.S. Pat. No. 5,056,051, discloses an apparatus and method of calibrating a DF processing system. Tkalcevic measures the phase and amplitude responses of received signals over a narrow passband. The passband is divided into a number of segments called "bins", each bin is associated with a component of the FFT of the signal. Since each bin includes phase and amplitude information, both sets of values may be averaged to produce an average along the passband calibrated.

The Tkalcevic method is not practical for wideband usage because several signals might be present in a passband that may be wider than necessary. DF tuners have a maximum frequency range which they may cover. Retuning of the DF tuners is required each time a new frequency range is scanned by the DF system. There is a need for a calibration method that minimizes the amount of tuning required for the entire range of frequencies measured by a wideband DF system.

The present invention seeks to provide a method of calibrating a wideband DF system using a frame sampling method.

SUMMARY OF THE INVENTION

The invention is a method of calibrating the sensor system of a wideband direction finder using a noise source. The sensor system includes at least two wideband tuners, and an analog/digital (A/D) converter connected to each wideband tuner. The calibration method involves selecting a common set of centre frequencies for each of the wideband tuners. The wideband tuners receive a signal from the noise source on a per data frame basis through a combining network. The passband of the received signal is then divided into a number of time-sampled data frames, with the division being dependent on the centre frequencies. The data frames have an equal bandwidth to ensure complete coverage of the frequency range. For each signal received at a wideband DF tuner, the signal is sampled within the frame. For each time-sampled data frame, multiple frequency points are chosen. For each frequency point, both an amplitude and a phase are measured for the signal received at each wideband tuner. For each given frequency point, the differences between the data collected for a wideband tuner and the data collected for another wideband tuner is stored as time-sampled data corresponding to a time-sampled data frame.

A transformation in the frequency domain, such as a Fast Fourier Transform (FFT), is performed on each set of time-sampled data. The phase difference between the signals received by the two wideband tuners is calculated for each frame at each frequency. Based on the gain and the phase differences for the frequencies sampled by the tuners, the phase and gain differences for those frequencies not sampled by the tuners which have not been previously mapped can be determined. Methods of interpolation such as best-fit curve or a polynomial curve-fitting, may be used to determine the gain and the phase difference between the two wideband tuners for frequencies not covered in the sampled data. As a result, this calibration method determines a series of calibration factors for each frame, and for the entire passband.

In a first aspect, the present invention provides a method of calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the method including the steps of:

a) selecting a set of centre frequencies common for all wideband tuners in the direction finder;

b) dividing a passband of the noise source into a number of time-sampled data frames, such that the dividing is dependent on the centre frequencies;

c) for each time-sampled data frame received by each arm:

c1) reading a gain and a phase of the noise at each wideband tuner for a given frequency;

c2) processing the gain and the phase for each time-sampled data frame, to transform the gain and the phase into the frequency domain and to obtain intermediate results;

c3) calculating a gain difference and a phase difference between the intermediate results output from each arm;

c4) repeating steps c1) to c3) for each given frequency in a chosen group of frequencies, the chosen group of frequencies being within a frequency range of the time-sample data frame; and c5) averaging the gain and the phase difference obtained in step c4) for the time-sampled data frame to obtain a calibration factor having a gain component and a phase component; and d) adjusting the sensor system based on the calibration factor;

wherein a passband of the noise source covers at least one portion of a desired radio frequency band.

In a second aspect, the present invention provides a method of calibrating a sensor system of a wideband direction finder having at least two antenna elements by using a noise source, the direction finder having at least two arms, each arm having a wideband tuner for receiving a noise signal on a per data frame basis from the noise source, and an analog/digital converter, the wideband tuner being coupled to the analog/digital converter, with each arm coupled to the data processing means through the analog/digital converter, the method including the steps of:

a) coupling the noise source to the each wideband tuner in each arm;

b) selecting a set of centre frequencies common for all wideband tuners in the direction finder;

c) dividing a passband of the noise source into a number of time-sampled data frames, such that the dividing is dependent on the centre frequencies;

d) for each time-sampled data frame received by each arm:

d1) converting the noise signal into a digital noise signal for a given frequency;

d2) processing the digital noise signal to transform the digital noise signal into the frequency domain;

d3) reading a gain and a phase of a transformed digital noise signal for each time-sampled data frame to obtain intermediate results;

d4) calculating a gain difference and a phase difference between the intermediate results output from each arm;

d5) repeating steps d1) to d4) for each given frequency in a chosen group of frequencies, the chosen group of frequencies being within a frequency range of the time-sampled data frame;

d6) averaging the gain and the phase difference obtained in step d5) for the time-sampled data frame to obtain a calibration factor having a gain component and a phase component; and e) adjusting the sensor system based on the calibration factor;

wherein a passband of the noise source covers at least one portion of a desired radio frequency band.

In a third aspect, the present invention provides a method of calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the method including the steps of:

a) selecting a set of centre frequencies common for all wideband tuners in the direction finder;

b) dividing a passband of the noise source into a number of time-sampled data frames such that the dividing is dependent on the centre frequencies;

c) for each time-sampled data frame received by each arm:

c1) reading a gain and a phase of the noise at each wideband tuner for a given frequency;

c2) processing the gain and the phase for each time-sampled data frame to transform the gain and the phase into the frequency domain and to obtain intermediate results;

c3) calculating a gain difference and a phase difference between the intermediate results output from each arm;

c4) repeating steps c1) to c3) for each given frequency in a chosen group of frequencies, the chosen group of frequencies being within a frequency range of the time-sample data frame;

c5) interpolating the gain and the phase difference obtained in step c4) for the time-sampled data frame to obtain a calibration factor for a frequency not part of the chosen group of frequencies, the calibration factor having a gain component and a phase component; and d) adjusting the wideband tuners based on the calibration factor;

wherein a passband of the noise source covers at least one portion of a desired radio frequency band.

In a fourth aspect, the present invention provides computer readable media having embodied thereon computer readable and computer executable instructions for a method of calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the method including the steps of:

a) selecting a set of centre frequencies common for all wideband tuners in the direction finder;

b) dividing a passband of the noise source into a number of time-sampled data frames, such that the dividing is dependent on the centre frequencies;

c) for each time-sampled data frame received by each arm:

c1) reading a gain and a phase of the noise at each wideband tuner for a given frequency;

c2) processing the gain and the phase for each time-sampled data frame, to transform the gain and the phase into the frequency domain and to obtain intermediate results;

c3) calculating a gain difference and a phase difference between the intermediate results output from each arm;

c4) repeating steps c1) to c3) for each given frequency in a chosen group of frequencies, the chosen group of frequencies being within a frequency range of the time-sample data frame;

c5) averaging the gain and the phase difference obtained in step c4) for the time-sampled data frame to obtain a calibration factor having a gain component and a phase component; and d) adjusting the wideband tuners based on the calibration factor;

wherein a passband of the noise source covers at least one portion of a desired radio frequency band.

In a fifth aspect, the present invention provides a computer system constructed and configured to execute computer readable and computer executable instructions having embodied therein a method of calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the method including the steps of:

a) selecting a set of centre frequencies common for all wideband tuners in the direction finder;

b) dividing a passband of the noise source into a number of time-sampled data frames, such that the dividing is dependent on the centre frequencies;

c) for each time-sampled data frame received by each arm:

c1) reading a gain and a phase of the noise at each wideband tuner for a given frequency;

c2) processing the gain and the phase for each time-sampled data frame, to transform the gain and the phase into the frequency domain and to obtain intermediate results;

c3) calculating a gain difference and a phase difference between the intermediate results output from each arm;

c4) repeating steps c1) to c3) for each given frequency in a chosen group of frequencies, the chosen group of frequencies being within a frequency range of the time-sample data frame;

c5) averaging the gain and the phase difference obtained in step c4) for the time-sampled data frame to obtain a calibration factor having a gain component and a phase component; and d) adjusting the wideband tuners based on the calibration factor;

wherein a passband of the noise source covers at least one portion of a desired radio frequency band.

In a sixth aspect, the present invention provides a system for calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the system comprising:

means for selecting a set of centre frequencies common for all wideband tuners in the direction finder;

means for dividing a passband of the noise source into a number of time-sampled data frames, such that the dividing is dependent on the centre frequencies;

means for reading a gain and a phase of the noise at each wideband tuner for a given frequency;

means for processing the gain and the phase for each time-sampled data frame, to transform the gain and the phase into the frequency domain and to obtain intermediate results;

means for calculating a gain difference and a phase difference between the intermediate results output from each arm;

means for averaging the gain and the phase difference for the time-sampled data frame to obtain a calibration factor having a gain component and a phase component; and means for adjusting the wideband tuners based on the calibration factor.

The present invention seeks to provide a method for calibrating a DF system for radio signals over a frequency range in the order of 20 MHz to 2.5Ghz. Each time-sampled frame has data that can be used to calibrate any signal received within the frequency range. The methods of interpolation or best-fit curves provide reasonably accurate calibration methods for a wideband direction finder.

BRIEF DESCRIPTION OF THE DRAWINGS

A better understanding of the invention will be obtained by a consideration of the detailed description below, in conjunction with the following drawings, in which.

DETAILED DESCRIPTION

Figure 1:
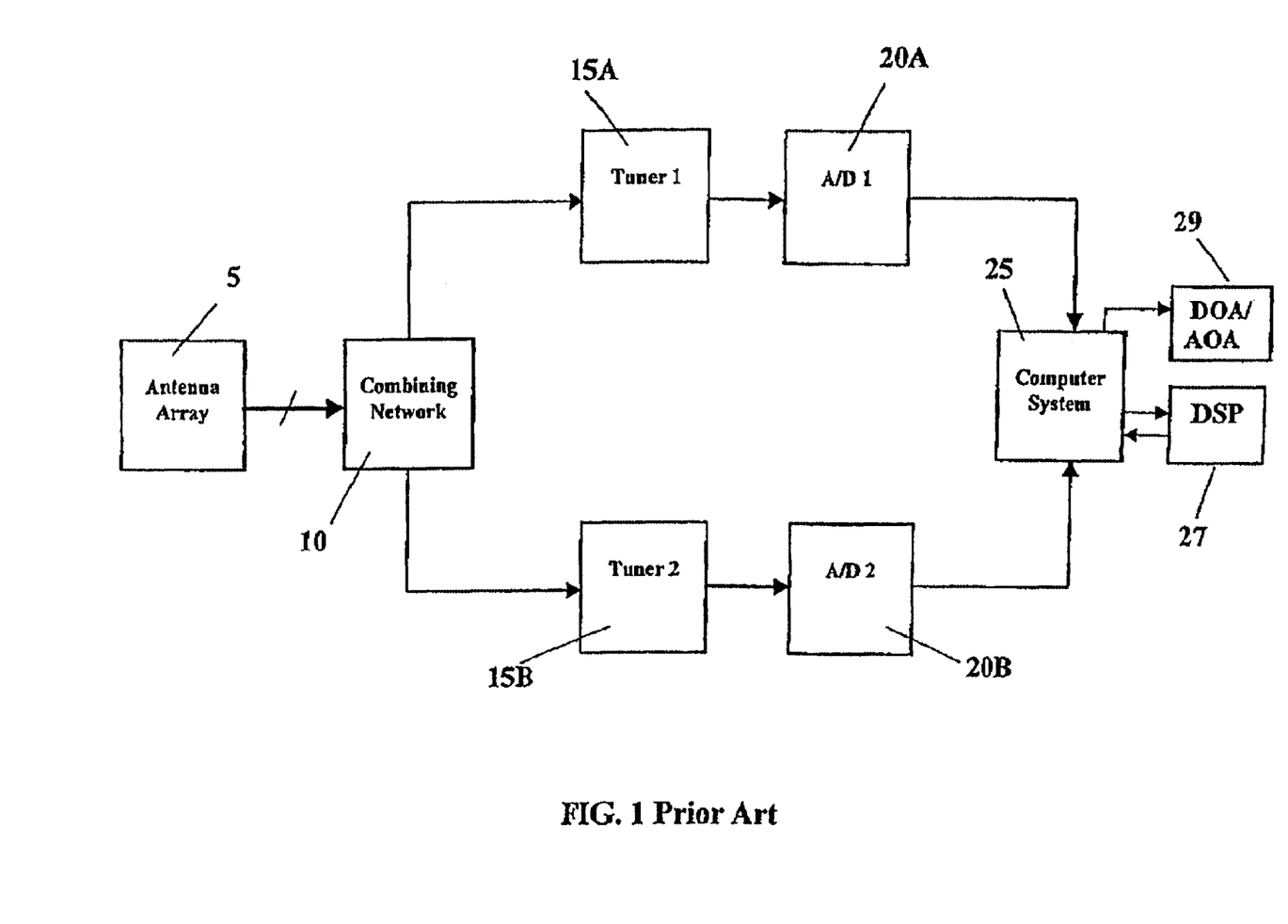
FIG. 1 shows a basic DF system according the prior art.

FIG. 1 is a block diagram which illustrates the components of a typical wideband DF phase narrow aperture system. Such a system is normally referred to as being an interferometer type because it takes advantage of the interference between two versions of the same signal to determine the DOA and the AOA of the signal. Typically, the antenna array 5 is a circular arrangement usually including either 4 or 8 elements. The signals received by the antenna elements are fed to the combining network 10. The combining network reduces the number of feed lines to a summation reference and two phase direction signals. The combining network 10 is connected to two wideband tuners 15A, 15B, which are connected to two A/Ds 20A, 20B. Each of the A/Ds 20A, 20B converts the analog signal it receives from the tuners 15A, 15B into a digital signal to simplify signal processing. A computer system 25 is connected to the A/Ds 20A, 20B. The computer system 25 performs gain and phase difference measurements on the output of the two A/Ds. The DSP unit 27, which is usually part of the computer system 25, performs a FFT on the A/D output. The computer system 25 then processes the gain and the phase difference results from the FFT data to determine the DOA and/or the AOA 29 of the signal.

Figure 2:
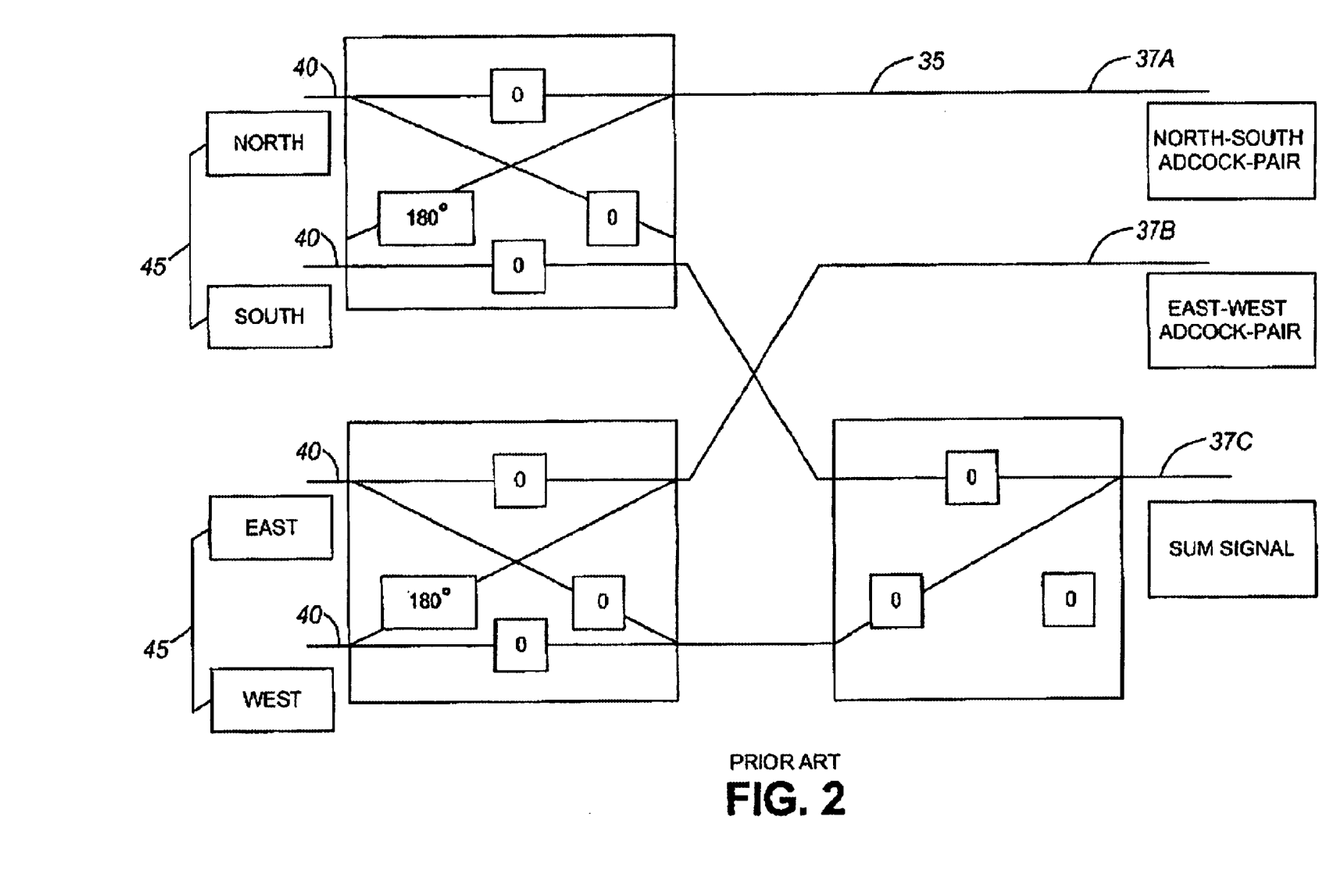
FIG. 2 shows a non-rotating Adcock system consisting of four antenna elements according to the prior art.

Regarding the antenna array 5, some nonrotating antennas may also be used. FIG. 2 illustrates a non-rotating Adcock antenna system 35 commonly used in commercial narrow aperture DF antenna systems. The Adcock antenna 35 consists of four antenna elements 40, grouped into two Adcock-pairs 45 perpendicular to each other. The relative amplitudes of the signals from the two bidirectional pairs indicate the AOA of the received signal. The received signals are combined into three synchronized receiver lines 37A, 37B, 37C.

The signal detection system relies on accurately detecting the relative amplitude of the signals in the presence of noise, fading and modulation.

Figure 3:
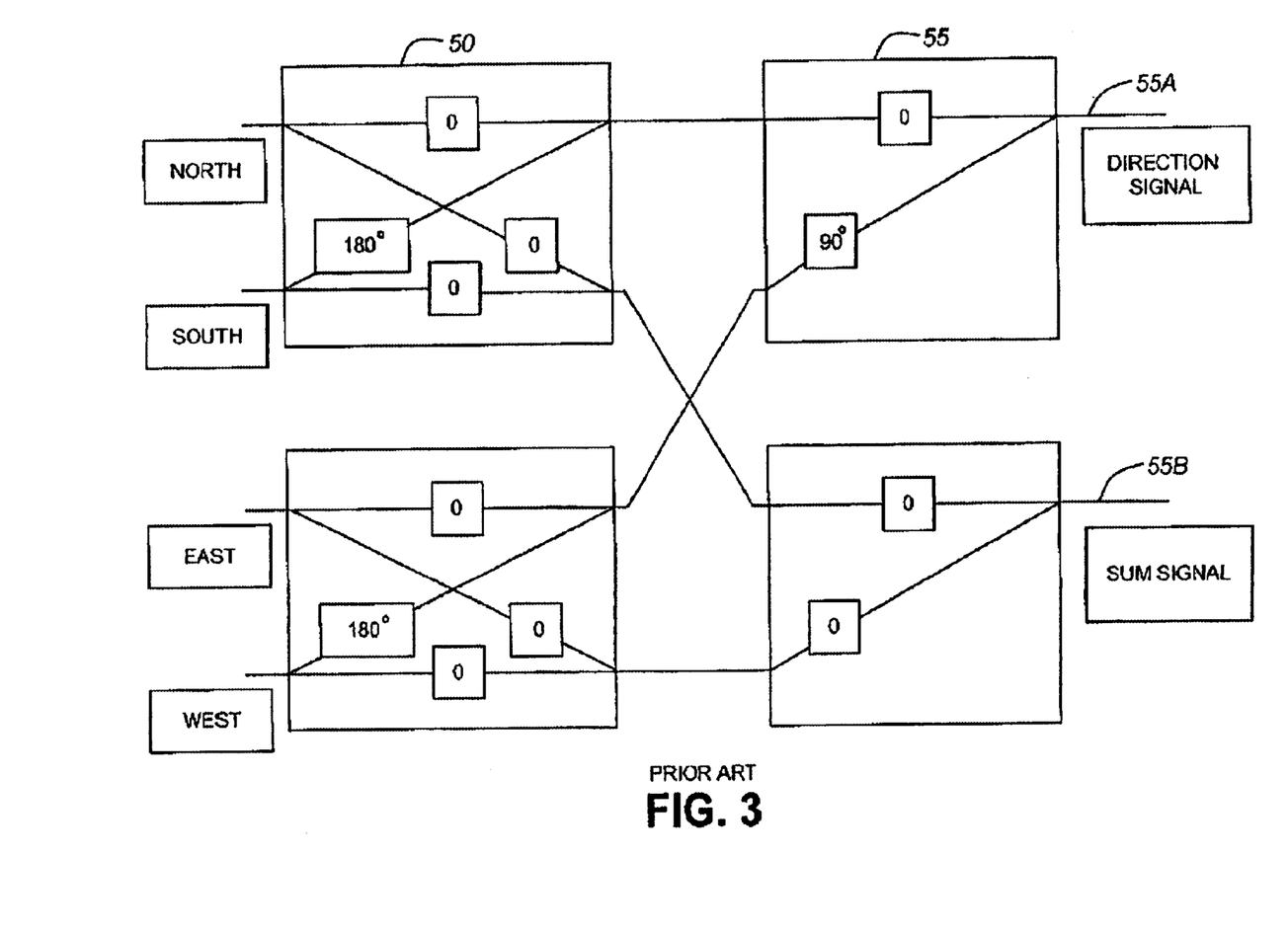
FIG. 3 shows an Adcock antenna configured as a standard Butler Matrix antenna according to the prior art.

FIG. 3 illustrates a simpler antenna configuration as compared to the three synchronized receiver lines of FIG. 2. The standard Adcock signal combining technique for the perpendicular Adcock pairs is modified to connect to a quadrature combiner 55. The quadrature combiner 55 provides two output signals 55A, 55b. These are a direction signal 55A, and a sum signal 55B. This technique provides bandwidth and accuracy. More importantly, experiments have shown that the Adcock antenna 50 with quadrature combiner 55 performs well in combination with a DF system using a wideband tuner and high speed A/D in combination. This type of antenna is preferred in a wideband DF system.

Antenna calibration is a required step in the DF system calibration. Antenna calibration corrects alignment and phase variations in the antenna elements and/or the combining network. These phase variations are generally frequency dependent and may require a piecewise interpolation or higher order polynomial fitting to arrive at a function that fits the received data. One known technique to obtain the calibration data uses a localized transmitter that changes its frequency while the DF system measures the signal direction. Feedback is required from the transmitter to the actual DF site to coordinate the signal transmission and reception. The results of the antenna calibration are stored in an antenna correction frequency table list in a computer system. The antenna correction list should have data columns for the gain and the phase differences measured.

The DF system is usually calibrated in two steps. In the first step, the sensor is calibrated by attaching a signal source where the combining network would be attached to the system in FIG. 1. The sensor calibration removes the effect of the tuner A/D group delay and gain variations over the system bandwidth coverage. In the second step, the antenna is calibrated using a localized transmitter with a noise. The antenna may be calibrated prior to calibrating the sensors. These steps can be carried out it either order. The antenna calibration varies depending on the antenna type and/or combination of antennas used in the DF system. It should be mentioned that the antenna calibration method is user configurable. The user calibrates the antenna system based on the type of antennas, particular location requirements and radio frequencies of interest.

The sensor calibration will now be explained with reference to FIGS. 4, 5, 6, and 7.

Figure 4:
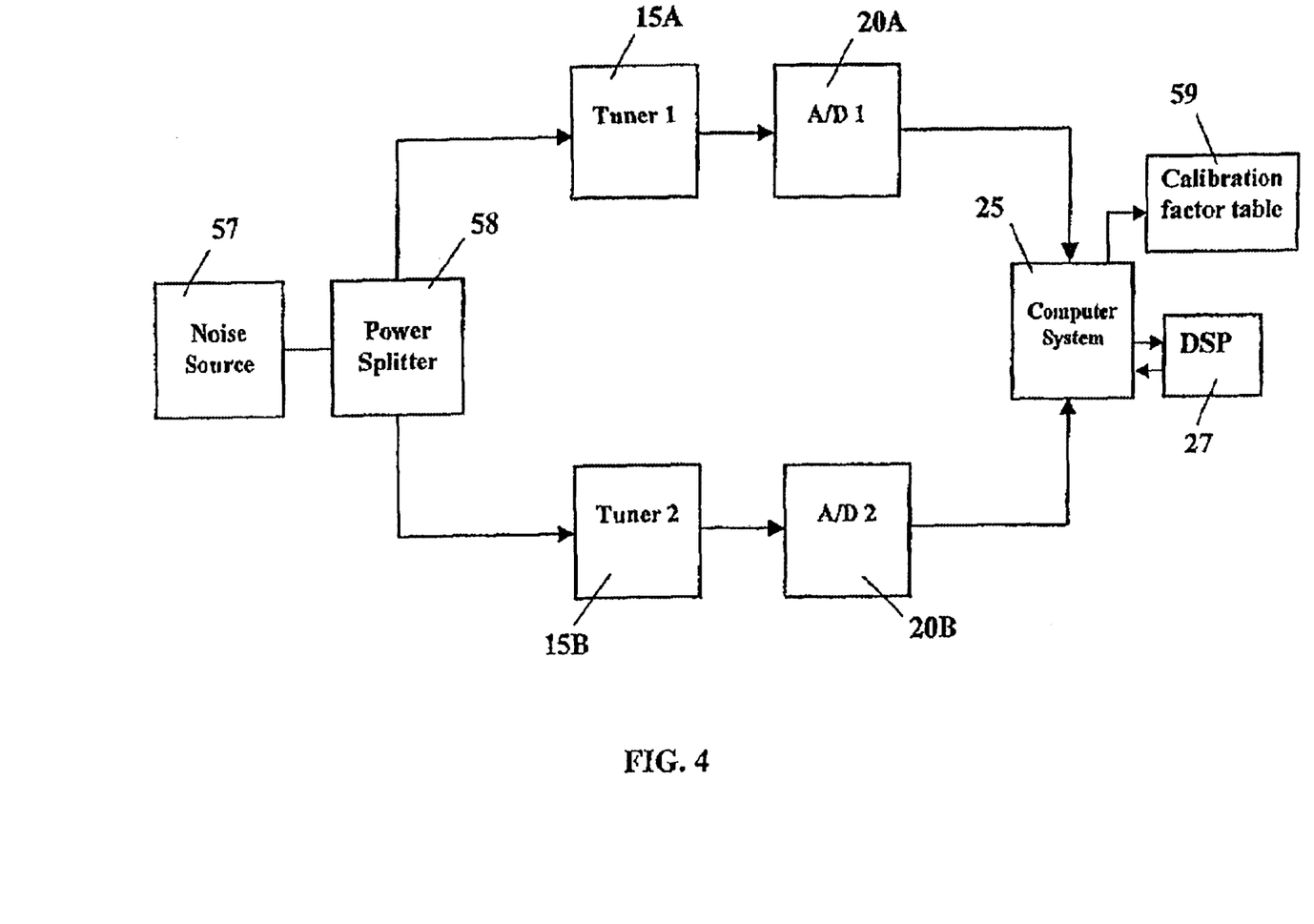
FIG. 4 shows a calibration configuration of a wideband DF system according to the present invention.

FIG. 4 illustrates a block diagram of a sensor calibration method for the DF system as shown in FIG. 1. The sensor calibration utilizes a wideband noise source 57 with a noise source power density that exceeds the equipment sensitivity by at least 20 dB. The noise source 57 must be connected via a power splitter 58 to the wideband tuners 15A, 15B. The power splitter ensures a proper phase and amplitude balance. The wideband tuners 15A, 15B scan a specified frequency range. The frequency range is delineated by frames which are divided into a number of bins. The two wideband tuners 15A, 15B, are connected to analog/digital (A/D) converters 20A, 20B to convert the analog noise signal into a digital signal. A digital signal processing (DSP) unit 27, part of the computer system 25, performs a FFT on each frame of output received from the A/Ds 20A, 20B. The DSP unit 27 processes the FFT data and the computer system 25 determines the gain and the phase differences in each frame for the noise signal received. The DSP unit 27, while illustrated in the Figure, may be replaced by a single CPU contained in the computer system 25. This process includes determining the gain and phase differences between the signals received at the two wideband tuners for each frame. A calibration factor table 59 is compiled with each table entry,being based on the gain and phase differences. The actual DF measurements are adjusted based on the calibration factors in the table and the frequency coverage of the frame being scanned.

Figure 5:
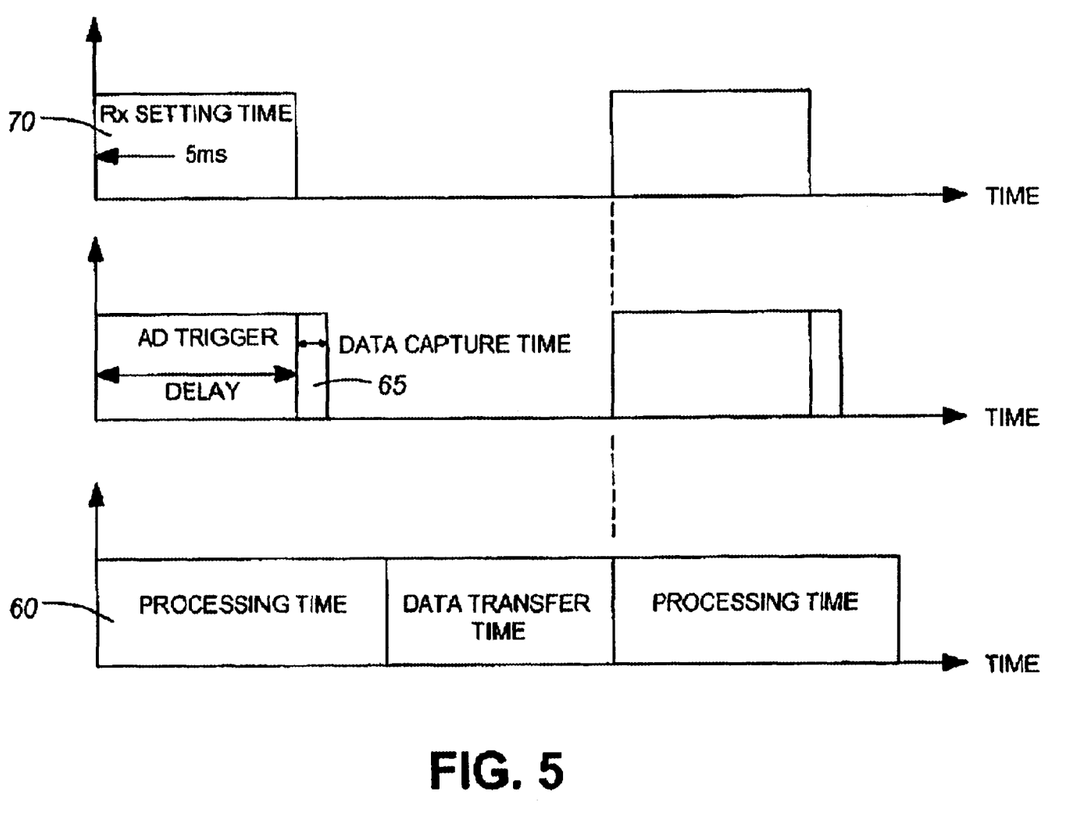
FIG. 5 shows a data acquisition timing diagram of the present invention.

FIG. 5 illustrates the data acquisition timing diagram between the wideband tuners with A/Ds scanning a received signal within a frequency frame and the computer processing the output of the A/Ds. For optimal scanning speeds, the processing time 60 on the previous data frame should occur in parallel with the receiver settling time 70 and the next data frame acquisition time 65.

The following pseudo-code summarizes the steps in calibrating the equipment.

Begin
Initialize System
Set Tuner to the first data frame
Set the A/D trigger delay value to the receiver tuning speed
With Processor
  For each valid tuner frame
    Read data
    Set Tuner at next tuner frame
    Trigger A/D
    Process data (Compute FFT, phase measurements)
  Next
End With
End It should be noted that the process data step produces the calibration factors from the FFT data and the phase measurements.

When each wideband tuner is tuned to a particular frame, each frame has a predetermined bandwidth. Typically, these frames will extend from the minimum to the maximum frequency coverage of the tuner. The step in frequency is dependent on the A/D sampling rate and effective bandwidth of the tuner.

Figure 6:
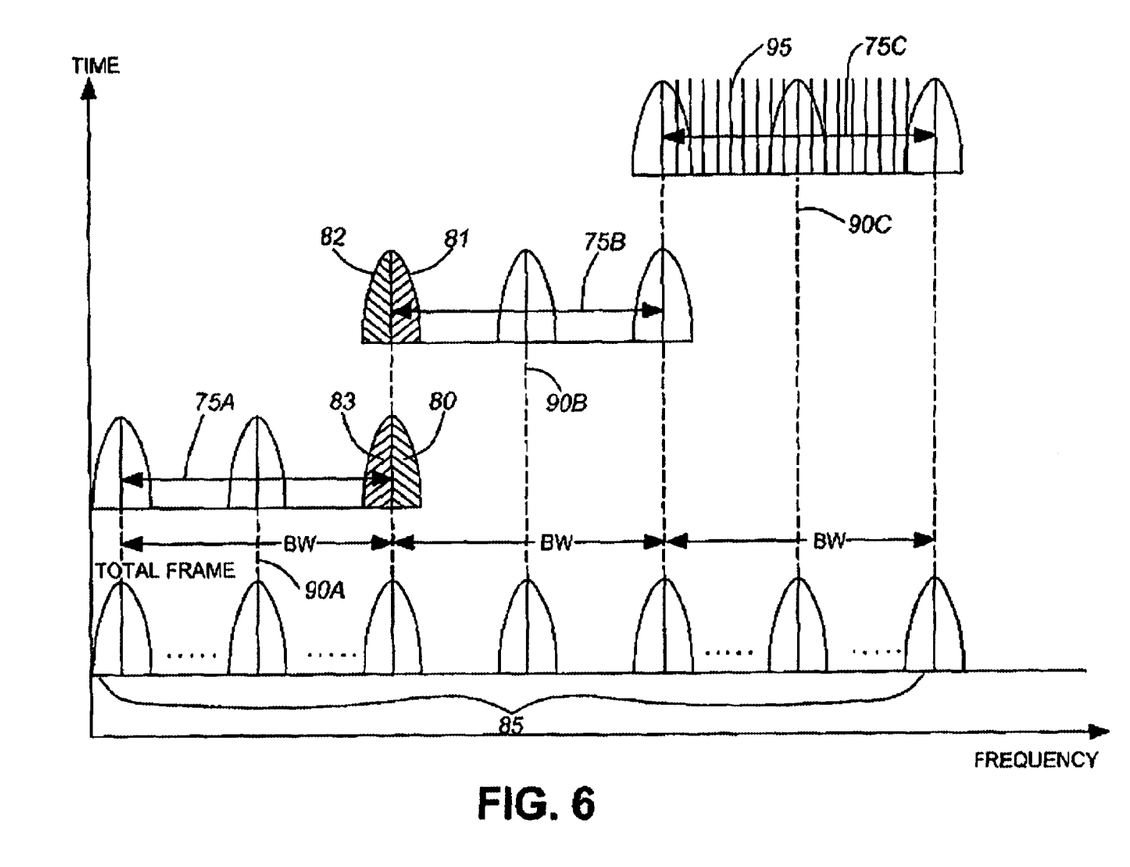
FIG. 6 shows a graph illustrating the frame scanning technique of the present invention.

FIG. 6 illustrates the frame scanning technique with a few frames 75A, 75B, 75C shown. The group of frequencies at the shaded portion 80 past the coverage of frame 75A overlaps the beginning portion 81 of frame 75B. It should be noted that the group of frequencies in the shaded portion 82 overlaps the end portion 83 of the frame 75A. It should be clear that shaded portions 80 and 82 are not part of either frames 75A or 75B. The frequency coverage of the frames do not overlap but the scanning frequency regions for each frame overlaps a portion of both the immediately preceding and immediately succeeding frames. As can be seen from FIG. 6, and as explained above, shaded portion 82 is part of the scanning frequency region for frame 75B and overlaps the coverage of frame of 75A but is not part of the coverage of frame 75B.

The passband of the DF system is divided into a number of scanning regions, and each scanning region is covered by a frame. The frames may be scanned sequentially by the wideband tuners or out of order as the user desires. It is preferred that the sequential scanning is performed by scanning the frames in order of their increasing frequency coverage such that frequencies covered by a succeeding frame are higher than frequencies covered by a preceding frame. If a frequency being scanned is at a border between frames, the calibration factor to be used for that frequency is to be taken from the frame which covers a higher frequency range. Thus, from FIG. 6, if the frequency being scanned is that between the shaded regions 83 and 80, the calibration factor to be applied will be the calibration factor from frame 75B and not the calibration factor from frame 74A. The number of frames may be dependent on the user desired frequency coverage, or the frequency bandwidth of a frame, or a combination of the two. The above assumes that the frequency bandwidth is equal for all frames.

The A/D sampling process is performed for each frequency range in a frame. The A/D sampling rate is selected based on maximizing the bandwidth of the system. A higher sampling rate will increase the scanning speed of the system. One method of determining the bandwidth of the frames is by using so-called tuner centre frequencies. The radio frequency range is divided into regions with substantially equal bandwidth. The frequencies which divide the frequency range are the tuner centre frequencies. Once these tuner centre frequencies are found, frames and their bandwidth can be determined. Essentially, by using the tuner centre frequencies as being the frequency at the centre of a frame, and by arranging the frames such that they all have substantially equal bandwidth, the frame arrangement becomes self evident. The tuner centre frequencies 90A, 90B, 90C are shown in FIG. 6. The tuner centre frequencies 90A, 90B, 90C are chosen so as ensure that the phase and amplitude factors stay valid across the required antenna radio frequency range 85. Each frame 75 will consist of a number of bins 95. The sampling rate of the A/Ds will define the size of the bins for the entire frequency coverage. As well, the selected frame bandwidth is ideally an exact multiple of the bin frequency bandwidth. For an odd number of bins in a selected frame, there should be an equal number of bins on either side of the central tuning frequency bin.

As can be seen from FIG. 6, the frequency range 85 is divided into 2 complete regions and two half regions by the centre frequencies 90A, 90B, 90C. The two complete regions are between centre frequencies 90A and 90B and between 90B and 90C. The two half regions are between the beginning of the frequency coverage 85 and centre frequency 90A and centre frequency 90C and the end of the frequency coverage 85. From these centre frequencies 90A, 90B, 90C, frames 75A, 75B, 75C are obtained as the dividing frequency between frame 75A and frame 75B is approximately halfway between centre frequencies 90A and 90B. Similarly, the dividing frequency between frame 75B and frame 75C is approximately halfway between centre frequencies 90B and 90C.

An example will be used to explain the frame bandwidth selection. In wideband scanning mode, the noise signal is sampled or a sampling rate, $F_s$, of 5.12 MHz. Due to the effects of the A/D filter image rejection (FIR), a 3 dB bandwidth is approximated, as $BW_{3dB}$=4.5 MHz. Assuming that the maximum resolution bandwidth, $Rb_{max}$, that the system is allowed to operate with is 160 kHz or 32 FFT bin points ($N_{min}$), the number of bins ($N_{3dB}$) with resolution Rbmax included in $BW_{3dB}$ of the A/D is calculated as:

$$N_{3dB}=(BW_{3dB} \times N_{min})/F_s=28.125.$$

The value calculated for $N_{3dB}$ must be reduced to the closest odd integer number, which is 27. The effective bandwidth of the frame can be found by multiplying the maximum resolution bandwidth, 160 kHz by the number of bins, $N_{3dB}$. This results in an effective frame bandwidth of 4.32 MHz. According to this example, each consecutive tuning step is incremented by 4.32 MHz. Based on this example, the frame bandwidth is also 4.32 MHz.

Figure 7:
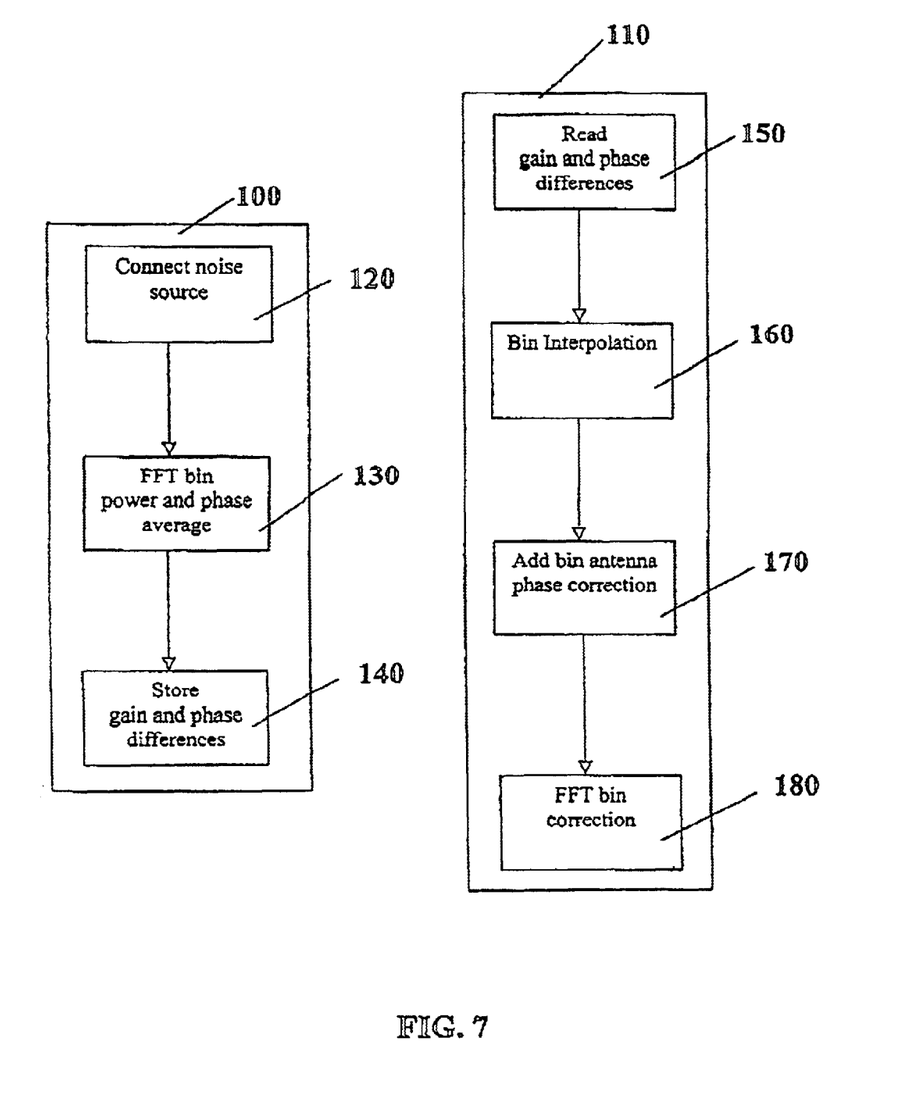
FIG. 7 shows a flowchart detailing the steps of the sensor calibration of the present invention.

FIG. 7 illustrates the main steps in the DF sensor calibration in two flowcharts, the calibration data capture 100 and the calibration factor calculation process 110. The calibration factor calculation will include the antenna calibration. For the flowcharts 100 and 110, it is assumed that the antenna calibration has already been performed and that the results of this antenna calibration have been stored in an antenna calibration table. Step 120, involves connecting a noise source, or any known suitable signal source, to the two wideband tuners. Scanning over the specified frequency range commences and in step 130, the FFT bin power and phase direction is captured, as sampled, and then averaged. For each bin, step 140 stores the captured gain and phase differences for both tuners for the same frequency bin in a frequency table list. The frequency table list, which is stored in the computer system, has data for both the gain and the phase differences.

The next process 110 is illustrated in the flowchart. A first step 150 involves reading the gain, and the phase differences in the frequency table list of step 140. The calculation process is performed by a computer system. In step 160, the phase difference, which is calculated between the frequency domain data captured for both tuners at corresponding bins, is interpolated for frequencies not specifically covered by the scanning. Thus, if a frequency B is between frequencies A and C, and a data exists for frequencies A and C, the relevant data for frequency B can be interpolated from the data sets for frequencies A and B. Such an interpolation step may be performed in a number of ways. This step calculates the phase difference for frequencies not captured within the frame. This step also calculates the phase differences for the sampled data. Methods such as best-fit curve, averaging, or polynomial curve-fitting, are all well-known techniques and may be used to produce calibration factors for the entire frequency range for each scanned frame.

A simple example will be used to explain how interpolation may be used to determine the gain and/or the phase variation for frequencies not covered in the sample data for calibration purposes. As previously described, the sensor system scans a frame and samples a predetermined number of frequencies. In our example we will use two frequencies, $f_1$=4.50 MHz and $f_3$=4.52 MHz. The gain differences between the two wideband tuners was measured at 0.3 dB and 0.4 dB for $f_1$ and $f_3$ respectively. To determine the approximate gain differences for a frequency $f_2$=4.51 MHz, a linear interpolation technique is used.

We equate $x*(f_3+f_1)/2$=4.51 MHz to determine the interpolation formula. For x*(4.50 MHz+4.52 MHz)/2=4.51 MHz, x is equal to 1. We may then apply this formula for the gain differences: (0.3 dB+0.4 dB)/2=0.35 dB. Thus, the gain difference for $f_2$ is 0.35 dB.

The next step 170 involves adding the antenna phase correction to the sensor phase difference calculated in the previous step 160. As noted above, the results of an antenna calibration are assumed to have been stored in antenna calibration table. The same method is applied for the gain correction factor of the antenna system. In step 180, FFT points in the frame bandwidth are corrected according to their respective correction phase. These results are used to calculate the DOA and AOA of various signals scanned by the DF system. The gain and phase differences of the noise signal received by the sensor system may be subtracted, on a per frame basis, from the transmitted noise signal gain and phase values. This calculation would provide a standard deviation of the gain and the phase measurement for the sensor system. The variance (the square of the standard deviation) may be calculated for each gain and phase value along the entire frequency coverage. According to the calibration method of the present invention, if the variance is calculated it should be within 1 degree peak to be considered an acceptable value. The calibration results of the antenna and the sensors may be stored in variance form in the frequency table list.

Temperature and other environmental conditions may vary the accuracy of the calibration factor but typically the calibration factor should remain stable over a period of time. The resultant calibration factor for the DF system sums the effects of the tuners and A/Ds, cable length variation and antenna correction.

The calibration method of the present invention may be embodied in a computer system constructed and configured to execute the computer readable and computer executable instructions according to the method. As well, a computer readable media may have embodied thereon computer readable and computer executable instructions that perform the calibration method for a wideband DF system.

We claim:

1. A method of calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the method including the steps of:
   a) selecting a set of centre frequencies common for all wideband tuners in the direction finder;
   b) dividing a passband of the noise source into a number of time-sampled data frames, such that the dividing is dependent on the centre frequencies;
   c) for each time-sampled data frame received by each arm:
      c1) reading a gain and a phase of the noise at each wideband tuner for a given frequency;
      c2) processing the gain and the phase for each time-sampled data frame, to transform the gain and the phase into the frequency domain and to obtain intermediate results;
      c3) calculating a gain difference and a phase difference between the intermediate results output from each arm;
      c4) repeating steps c1) to c3) for each given frequency in a chosen group of frequencies, the chosen group of frequencies being within a frequency range of the time-sample data frame; and
      c5) averaging the gain and the phase difference obtained in step c4) for the time-sampled data frame to obtain a calibration factor having a gain component and a phase component; and
   d) adjusting the sensor system based on the calibration factor;
   wherein a passband of the noise source covers at least one portion of a desired radio frequency band.

2. A method of calibrating a sensor system of a wideband direction finder having at least two antenna elements by using a noise source, the direction finder having at least two arms, each arm, having a wideband tuner for receiving a noise signal on a per data frame basis from the noise source, and an analog/digital converter, the wideband tuner being coupled to the analog/digital converter, with each arm coupled to the data processing means through the analog/digital converter, the method including the steps of:
   a) coupling the noise source to the each wideband tuner in each arm;
   b) selecting a set of centre frequencies common for all wideband tuners in the direction finder;
   c) dividing a passband of the nose source into a number of time sampled data frames, such that the dividing is dependent on the centre frequencies;
   d) for each time-sampled data frame received by each arm:
      d1) converting the noise signal into a digital noise signal for a given frequency;
      d2) processing the digital noise signal to transform the digital noise signal into the frequency domain;
      d3) reading a gain and a phase of a transformed digital noise signal for each time-sampled data frame to obtain intermediate results;
      d4) calculating a gain difference and a phase difference between the intermediate results output from each arm;
      d5) repeating steps d1) to d4) for each given frequency in a chosen group of frequencies, the chosen group of frequencies being within a frequency range of the time-sampled data frame;
      d6) averaging the gain and the phase difference obtained in step d5) for the time-sampled data frame to obtain a calibration factor having a gain component and a phase component; and
   e) adjusting the sensor system based on the calibration factor;
   wherein a passband of the noise source covers at least one portion of a desired radio frequency band.

3. A method as defined in claim 2, wherein step d1) for a first time-sampled data frame is executed in parallel with step d2) for a second time-sampled data frame.

4. A method as defined in claim 2, wherein each wideband tuner receives a noise signal for the time-sampled data frame in a sequential order along the passband, such that frequencies covered by a succeeding time-sampled data frame are higher than frequencies covered by a preceding time-sampled data frame.

5. A method as defined in claim 2, wherein for each time-sampled frame, a scanning frequency region for the frame overlaps a portion of an immediately preceding frame and a portion of an immediately succeeding frame.

6. A method of calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the method including the steps of:
   a) selecting a set of centre frequencies common for all wideband tuners in the direction finder;
   b) dividing a passband of the noise source into a number of time-sampled data frames such that the dividing is dependent on the centre frequencies;
   c) for each time-sampled data frame received by each arm:
      c1) reading a gain and a phase of the noise at each wideband tuner for a given frequency;
      c2) processing the gain and the phase for each time-sampled data frame to transform the gain and the phase into the frequency domain and to obtain intermediate results;
      c3) calculating a gain difference and a phase difference between the intermediate result output from each arm;
      c4) repeating steps c1) to c3) for each given frequency in a chosen group of frequencies, the chosen group of frequencies being within a frequency range of the time-sample data frame;

c5) interpolating the gain and the phase difference obtained in step c4) for the time-sampled data frame to obtain a calibration factor for a frequency not part or the chosen group of frequencies, the calibration factor having a gain component and a phase component; and d) adjusting the wideband tuners based on the calibration factor;

wherein a passband of the noise source covers at least ore portion of a desired radio frequency band.

7. A computer readable media having embodied thereon computer readable and computer executable instructions for a method of calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the method including the steps of:

a) selecting a set of centre frequencies common for all wideband tuners in the direction finder;

b) dividing a passband of the noise source into a number of time-sampled data frames, such that the dividing is dependent on the centre frequencies;

c) for each time-sampled data frame received by each arm:
   c1) reading a gain and a phase of the noise at each wideband tuner for a given frequency;
   c2) processing the gain and the phase for each time-sampled data frame, to transform the gain and the phase into the frequency domain and to obtain intermediate results;
   c3) calculating a gain difference and a phase difference between the intermediate results output from each arm;
   c4) repeating steps c1) to c3) for each given frequency in a chosen group of frequencies, the chosen group of frequencies being within a frequency range of the time-sample data frame;
   c5) averaging the gain and the phase difference obtained in step c4) for the time-sampled data frame to obtain a calibration factor having a gain component and a phase component; and d) adjusting the wideband tuners based on the calibration factor;

wherein a passband of the noise source covers at least one portion of a desired radio frequency band.

8. A computer system constructed and configured to execute computer readable and computer executable instructions having embodied therein a method of calibrating a sensor system of a wideband direction finder having at least two antenna elements using a noise source, the direction finder having at least two arms, each arm having a wideband tuner for receiving a noise on a per data frame bases from the noise source, with each arm coupled to the data processing means, the method including the steps of:

a) selecting a set of centre frequencies common for all wideband tuners in the direction finder;

b) dividing a passband of the noise source into a number of time-sampled data frames, such that the dividing is dependent on the centre frequencies;

c) for each time-sampled data frame received by each arm:
   c1) reading a gain and a phase of the noise at each wideband tuner for a given frequency;
   c2) processing the gain and the phase for each time-sampled data frame, to transform the gain and the phase into the frequency domain and to obtain intermediate results;
   c3) calculating a gain difference and a phase difference between the intermediate results output from each arm;
   c4) repeating steps c1) to c3) for each given frequency in a chosen group of frequencies, the chosen group of frequencies being within a frequency range of the time-sample data frame;
   c5) averaging the gain and the phase difference obtained in step c4) for the time-sampled data frame to obtain a calibration factor having a gain component and a phase component; and d) adjusting the wideband tuners based on the calibration factor;

wherein a passband of the noise source covers at least one portion of a desired radio frequency band.

9. A system for calibrating a sensor system of a wideband direction finder having at least two antenna elements using a noise source, the direction finder having at least two arms, each arm having a wideband tuner for receiving a noise on a per data frame basis from the noise source, with each arm coupled to the data processing means, the system comprising:

means for selecting a set of centre frequencies common for all wideband tuners in the direction finder;

means for dividing a passband of the noise source into a number of time sampled data frames, such that the dividing is dependent on the centre frequencies;

means for reading a gain and a phase of the noise at each wideband tuner for a given frequency;

means for processing the gain and the phase for each time-sampled data frame, to transform the gain and the phase into the frequency domain and to obtain intermediate results;

means for calculating a gain difference and results output from each arm;

means for averaging the gain and the phase difference for the time-sampled data frame to obtain a calibration factor having a gain component and a phase component; and means for adjusting the wideband tuners based on the calibration factor.

* * * * *